United States Patent [19]
Dean

[11] 3,839,923
[45] Oct. 8, 1974

[54] COAXIAL ROTORS FLIGHT CONTROL
[75] Inventor: James C. Dean, Stratford, Conn.
[73] Assignee: United Aircraft Corporation, East Hartford, Conn.
[22] Filed: Mar. 7, 1973
[21] Appl. No.: 338,712

[52] U.S. Cl. ................................ 74/522, 416/114
[51] Int. Cl. .......................................... B64c 11/30
[58] Field of Search ......... 416/43, 114, 115; 74/522

[56] References Cited
UNITED STATES PATENTS

| | | | |
|---|---|---|---|
| 2,644,534 | 7/1953 | Jensen | 416/43 X |
| 2,748,876 | 6/1956 | Daland et al. | 416/33 |
| 2,925,745 | 2/1960 | Watrous | 74/516 |
| 3,050,276 | 8/1962 | Wissinger | 416/31 UX |
| 3,507,166 | 4/1970 | Nix | 74/522 |
| 3,570,786 | 3/1971 | Lewis | 416/115 X |
| 3,589,831 | 6/1971 | Lemnios et al. | 416/114 X |
| 3,747,876 | 7/1973 | Fortna et al. | 74/522 X |

FOREIGN PATENTS OR APPLICATIONS

| | | | |
|---|---|---|---|
| 522,003 | 2/1956 | Canada | 416/115 |
| 995,459 | 8/1951 | France | 416/115 |

Primary Examiner—Everette A. Powell, Jr.
Attorney, Agent, or Firm—Maurice B. Tasker

[57] ABSTRACT

A helicopter having coaxial counterrotating rotors is provided with a reversible yaw control system which is required due to airflow reversal through the rotors in autorotation. The system includes a sensing means responsive to engine torque and to the position of the collective pitch control stick for operating a reversing device disposed between a foot pedal operated input link and a differential collective pitch control output link. The reversing device comprises a slotted link pivotally mounted at its midpoint and pivotally connected at one end to said input link by a pin slidable in the slot and pivotally connected at its opposite end to the output link. An actuator for said input link moves said slidable pin into the extreme ends of the slot on one side or the other of the midpivot point for the slotted link to reverse the direction of movement of the output link and thus reverse the collective pitch of the two rotors. The actuator, comprising cooperating cylinder and piston elements, includes a mechanical locking device for locking the actuator in its normal flight position. The actuator is hydraulically controlled by said sensing means.

10 Claims, 3 Drawing Figures

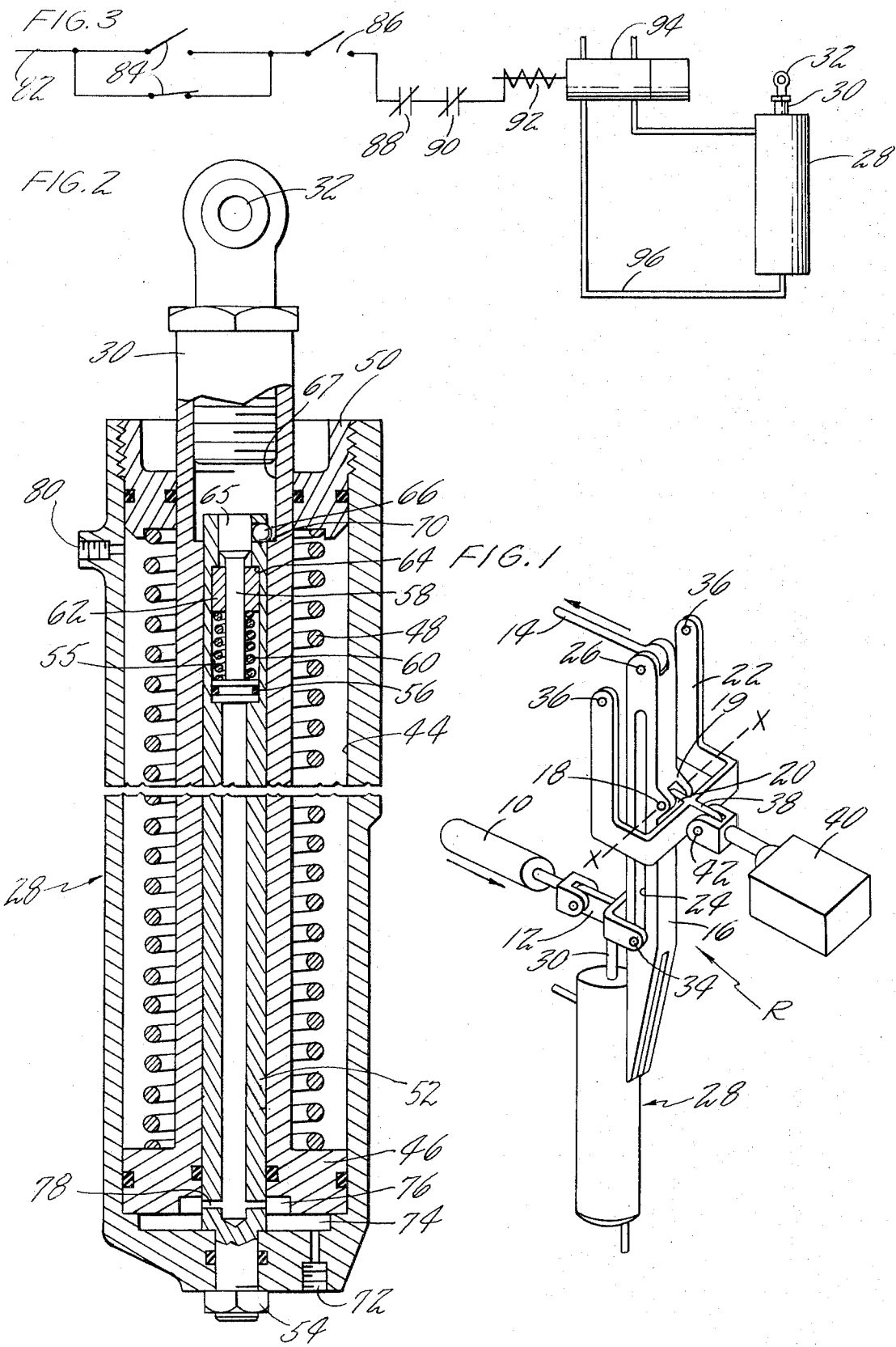

COAXIAL ROTORS FLIGHT CONTROL

The invention herein described was made in the course of or under a contract or subcontract thereunder with the Department of the Army.

BACKGROUND OF THE INVENTION

1. Field of the Invention

This invention relates to helicopters of the dual rotor counterrotating type. One of the known ways to obtain yaw control in helicopters of this type is to differentially control the collective pitch of the two rotors, this control being actuated by a pilot operated steering mechanism such as the common pedal mechanism. It is recognized that during autorotation air will flow upward through the rotors rather than downward as in normal flight, thus resulting in a control reversal in autorotation which can be dangerous, especially in landing.

The present invention provides a yaw control reversing system including an overcenter shifting linkage and a lockable actuator to provide such shifting.

2. Description of the Prior Art

The Kaman et al. U.S. Pat. No. 2,695,674, issued Nov. 30, 1954, discloses a dual rotor helicopter having a control motion reversing mechanism operable in response to the positioning of a collective pitch stick during change from normal flight to autorotation. This invention discloses a much simpler mechanism for performing this function.

The Driskel et al. U.S. Pat. No. 2,813,518, issued Nov. 19, 1957, and the Grover Pat. No. 2,632,425, issued Mar. 24, 1953, relate to the piston locking feature of this invention.

SUMMARY OF THE INVENTION

This invention relates more particularly to helicopters of the coaxial counterrotating type in which yaw control is obtained by differential control of the collective pitch of the two rotors to produce a torque reaction in either one direction or the other.

It is an object of this invention to provide a yaw control system for a coaxial rotor helicopter wherein a sensing means responsive to engine torque and the position of the collective pitch stick automatically operates a direction reversing device between the pilot operated pedals and the differential collective pitch control linkage so as to maintain normal yaw control in response to operation of the pedals in autorotation.

Another object of the invention is to provide an improved reversing device actuated by a hydraulic actuator for reversing the motion in the differential pitch control linkage in autorotation while maintaining normal pedal motion.

More specifically it is an object of this invention to provide such a reversing device including a main slotted link pivoted at a point midway of the length of the slot having one of its ends pivotally connected to the differential collective pitch linkage and connected to the pedal linkage by means of an input link having a pin slidable along the slot in the main link.

A still further object of this invention is to provide a hydraulic actuator for the input link of the reversing device in which a positive locking means is provided to maintain the device locked in any flight mode except autorotation when fluid pressure is applied to the actuator.

These and other objects and advantages of this invention will be obvious or will be pointed out in connection with the following detailed description of the accompanying drawings.

BRIEF DESCRIPTION OF THE DRAWINGS

FIG. 1 is a perspective view of the control motion reversing device and its actuator;

FIG. 2 is a longitudinal sectional view of the actuator and its positive locking means; and FIG. 3 is a diagrammatic view of the actuating means for the motion reversing device and the sensing means responsive to engine torque and collective pitch stick position.

DESCRIPTION OF THE PREFERRED EMBODIMENT

FIG. 1 shows the improved overcenter shifting linkage of this invention, generally indicated by the letter R, which is connected between the pilot's pedal rod 10 terminating in an input link 12 and an output link 14 of the differential collective pitch linkage. The shifting linkage comprises a main link 16 pivoted for movement about an axis $x - x$ on a pin 18. The main link is generally rectangular in cross section and has a bifurcated lug 19 at its pivot point which receives an ear 20 of a U-frame 22. Link 16 is provided with an elongated slot 24 which extends a substantial distance above and below its pivotal support. The upper end of link 16 is pivotally connected at 26 to output link 14. The lower end of link 16 carries a hydraulic actuator 28 below the lower end of slot 24, the piston rod 30 of which has an eye 32 by which it is pivotally connected to input link 12 by a pivot pin (not shown). Input link 12 has a bifurcated end which receives link 16 therebetween and a pin 34 extends through the bifurcated end of link 12 and through slot 24 in which it is freely slidable.

U-frame 22 is pivoted at its upper ends at 36 to fixed structure (not shown). This frame also has an ear 38, directly opposite ear 20, by which it is pivoted by a pin 42 to trim actuator 40.

Hydraulic actuator 28, best shown in FIG. 2, comprises a cylinder 44, and a piston 46 connected to rod 30. A spring 48 which bears against piston 46 at one end and cylinder head 50 at its opposite end constantly urges piston 46 downward against the end of the cylinder. The cylinder is of sufficient length to provide a stroke for the piston which is as long as the length of slot 24 in main link 16 of the shifting linkage and the arms of U-frame 22 are sufficiently spaced to permit input link 12 to move between them and allow pin 34 to move to the upper end of slot 34.

Actuator 28 is further provided with positive locking means for securing piston 46 in its lowermost position, as shown in FIG. 2, this being the position of the actuator and the over-center shifting linkage R in normal flight. To accommodate this locking means a sleeve 52 is provided within the tubular piston rod 30 which extends through the lower end of cylinder 44 and is secured by a nut 54. Sleeve 52 has an enlarged bore 55 at its upper end to receive a small piston 56 with an upstanding piston rod 58. A compression spring 60 bears against the top of piston 56 at one end and, at its other end, bears against a spacer 62 which seats against a shoulder 64 on sleeve 52. The reduced diameter of bore 55 above shoulder 64 accommodates an enlarged portion 65 of piston rod 58 which is engaged by one or more balls 66 confined in horizontal passages provided in sleeve 52. The bore 67 in rod 30 is enlarged in the vicinity of these balls to permit them to move outward when enlarged portion 65 of rod 58 is moved downward by piston 56 under the bias of its spring 60. In this outwardly displaced position balls 66 overlie the shoulder 70 on piston rod 30, thus positively locking piston rod 30 against movement in an upward direction.

Actuator 28 is double acting and to this end is provided with an inlet port 72 at its lower end which communicates with the annular space 74 in the cylinder beneath main piston 46. Space 74 is in fluid communication with space 76 and through radial passages 78 with the interior of sleeve 52 beneath piston 56. A second fluid passage 80 may be located at the upper end of main cylinder 44 to act as a hydraulic lock if redundancy to the mechanical lock is desired. It will be understood that as fluid enters one inlet the fluid in cylinder 44 will discharge through the other inlet. Control rod 10 contains a standard double acting spring centering device which allows the linkage to be expanded or collapsed in order to avoid jamming in the event that it is necessary to energize the actuator 28 when the link 16 is in other than a vertical position.

FIG. 3 shows somewhat diagramatically the more essential elements of the sensing mechanism which energizes the hydraulic actuator. In this figure, parts are shown in their normal flight position in which the actuator 28 is locked and the over-center shifting linkage is in the position of FIG. 1. Power is supplied at 82 from the generator (not shown). The circuit includes the pilot's and co-pilot's override switches 84, the normally open collective pitch stick switch 86 which closes automatically as the stick moves below the 15 percent raised position, the normally open pressure switches 88 and 90 on the two engine torque meters which automatically close when the torque of each engine falls below 10 percent of full torque, and the electrical solenoid 92 which controls the valve 94 and when energized supplies hydraulic fluid from a pressure source (not shown) to conduit 96 leading to actuator 28.

OPERATION OF THE SYSTEM

In normal flight, collective pitch stick switch 86 is open because the stick has to be raised well above its 15 percent raised position to maintain normal powered flight. Also switches 88 and 90 are both open because engine torque is well above 10 percent of full torque. Consequently solenoid 92 is not energized and hydraulic actuator 28 is in the FIG. 2 position in which its piston 46 is in the bottom of the cylinder and is positively locked in this position by locking balls 70. Input link 12 is in its lower position in which its pivot pin 34 is in the bottom of slot 24 of main link 16. Under these conditions normal yaw conditions prevail when the pedals are operated and, if rod 10 is moved to the right in FIG. 1 as indicated by the arrow, main link 16 will move counterclockwise about its pivot pin 18 to move output link 14 to the left as indicated by the arrow. Under these conditions air is moving down through the rotors.

If the pilot goes into autorotation as, for example, in making a landing, air is forced up through the rotors and a reversal of yaw control occurs. The collective pitch switch will be closed because the stick will have been moved below its 15 percent raised position. Also both switches 88 and 90 will be closed because both engines will be developing less than 10 percent of their rated torque. As a result solenoid 92 of valve 94 will supply fluid under pressure to inlet 72 of actuator 28. This fluid acting on the bottom of locking piston 56 will raise it against spring 60 releasing balls 66 so they can move inward away from locking shoulder 70 to release piston rod 30. Since fluid under pressure is acting simultaneously on the bottom of piston 46, connecting rod 30 will move input link 12, its pin 34 sliding along slot 24 until it reaches the upper end of the slot. The same movement of input link 12 to the right (FIG. 1) will now move output link 14 to the right, thus reversing the differential collective pitch applied to the rotors, as will be required to retain the same yaw movements of the pedals as were experienced in normal flight. This is of extreme importance, particularly in coming in for a landing, as it would be dangerous if a pilot were surprised by a reversal in yaw control close to the ground. The position of axis $x - x$ and pin 18 is adjustable for trim purposes by means of actuator 40, which may be of the conventional screw jack type.

It will be evident that by this invention a relatively simple and reliable overcenter shifting linkage has been provided in combination with an actuator lockable in normal flight position and a system wherein tne parameters of collective pitch stick position and engine torque are sensed and programmed to selectively operate the overcenter shifting linkage.

I do not desire to be limited to the exact details of construction shown and described, for obvious modifications will occur to a person skilled in the art.

I claim:

1. A linear motion reversing device including a generally vertical elongated lever pivoted at its midsection on fixed structure, said lever having a slot extending along its length for a substantial distance on both sides of its pivot, an output link pivoted to the upper end of said lever and movable in a generally horizontal direction as said lever moves about its pivot, an input link having a sliding pivotal connection with said lever including a pin carried by said input link which is slidable along the slot in said lever, and an actuator having an operative connection with said input link for moving the latter from one position in which said pin is in the bottom of said slot into another position in which said pin is in the top of said slot.

2. A linear motion reversing device including a lever pivoted at its midsection, said lever having a slot extending lengthwise of said lever on both sides of its pivot point, an output link pivoted to one end of said lever and movable generally transverse to the length of said lever as the latter moves about its pivot, an input link movable transverse to the length of said lever having a pivotal connection with said lever including a pin carried by said input link and slidable along said slot, an actuator pivotally connected with said input link for holding said input link in a normal position in which its pin is in one extremity of said slot in which a movement of said input link results in a movement of said output link in the opposite direction and movable into a second position in which said pin is in the other extremity of said slot to effect movement of the input and output links in the same direction upon a movement of said input link.

3. The reversing device of claim 2 in which the actuator is hydraulically operated between its two extreme positions and hydraulically controlled means is provided for positively locking said actuator in the normal position of said input link.

4. The reversing device of claim 3 in which the actuator is carried by said lever and swings with the latter as a unit about the pivot for the lever.

5. A reversible motion transmitting linkage having an input link, an output link, and an intermediate lever connecting said links having a pivot at its midsection, said lever also having a longitudinal slot which extends on opposite sides of its pivot, said output link having a fixed pivotal connection to said lever at a point spaced from said pivot and said input link having a movable pivotal connection to said lever comprising a pin slidable along said slot between a first position in which it is on one side of said pivot and a second position in which it is on the other side of said pivot, and means for reversing the direction of movement of said output link relative to movements of said onput link including an actuator having an operative connection with said input link for moving said pin between said first and second positions.

6. The combination of claim 5 in which the actuator is hydraulically operated and consists of cooperating stationary and movable cylinder and piston elements and means is provided within the cylinder element for locking the piston element positively to said cylinder element in said first position of said pin.

7. The combination of claim 6 in which the piston element has a piston rod and an axial sleeve is provided within said piston rod which is fixed to the cylinder element at one end and a locking piston is located within said sleeve, said locking piston having a piston rod which controls the locking of said piston element.

8. The combination of claim 7 in which the locking piston is biased to locking position by a spring and the cylinder element is provided with a fluid passage at one end for admitting fluid to act simultaneously on both the piston element and on said locking piston to actuate the latter against its spring and unlock the piston element of said actuator.

9. A reversible motion transmitting linkage comprising a lever having a slot along a substantial portion of its length, said lever having a pivotal support intermediate the ends of said slot, a linear input link reciprocable transversely of said lever having one end operatively connected to said lever by a pivot member free to travel along said slot, a linear output member reciprocable transversely of said lever having one of its ends pivotally connected to said lever at a point spaced from the pivotal support for the latter, and actuating means for moving said pivot member along said slot between positions on opposite sides of said pivotal support for said lever.

10. A reversible push-pull motion transmitting linkage comprising an input member and an output member, and means in said linkage for effecting reverse movements of said output member for the same movements of said input member, said means including a lever having a fixed pivot intermediate its ends and having a slot along its length extending on opposite sides of said pivot, said input member having a pivotal connection with said lever including a pivot pin slidable in said slot and said output member having a pivotal connection with said lever at one side of the fixed pivot for the latter, and actuating means for sliding the pivot for said input member along said slot from one side of said fixed pivot to the other.

* * * * *